US012282266B2

(12) United States Patent
Wada et al.

(10) Patent No.: US 12,282,266 B2
(45) Date of Patent: Apr. 22, 2025

(54) IMAGE FORMING APPARATUS

(71) Applicant: KYOCERA Document Solutions Inc., Osaka (JP)

(72) Inventors: Minoru Wada, Osaka (JP); Ryo Taniguchi, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 18/599,884

(22) Filed: Mar. 8, 2024

(65) Prior Publication Data

US 2024/0310751 A1 Sep. 19, 2024

(30) Foreign Application Priority Data

Mar. 15, 2023 (JP) ................................ 2023-040503

(51) Int. Cl.
*G03G 15/045* (2006.01)
*G03G 15/00* (2006.01)

(52) U.S. Cl.
CPC ....... *G03G 15/045* (2013.01); *G03G 15/6597* (2013.01); *G03G 2215/027* (2013.01); *G03G 2215/0404* (2013.01)

(58) Field of Classification Search
CPC ............ G03G 15/0812; G03G 15/065; G03G 15/0808; G03G 15/0806; G03G 15/0818
See application file for complete search history.

(56) References Cited

U.S. PATENT DOCUMENTS

| | | | | |
|---|---|---|---|---|
| 11,112,722 | B1 * | 9/2021 | Shimizu | G03G 15/065 |
| 2021/0041808 | A1 * | 2/2021 | Shimizu | G03G 15/5058 |
| 2021/0302867 | A1 * | 9/2021 | Shimizu | G03G 15/065 |

FOREIGN PATENT DOCUMENTS

| | | |
|---|---|---|
| JP | 2019-128409 A | 8/2019 |

* cited by examiner

*Primary Examiner* — Jessica L Eley
(74) *Attorney, Agent, or Firm* — Stein IP, LLC

(57) ABSTRACT

An image forming apparatus includes an image carrier, a charging device, an exposure device, a development device, and a development voltage power supply. The development device includes a development container storing a nonmagnetic one-component developer composed only of a toner, and a developer carrier on which a toner layer is formed on an outer circumferential surface thereof. The development voltage power supply applies a development voltage to the developer carrier. The image forming apparatus alternately forms white regions and exposed regions at a predetermined pitch repeatedly on a surface of the image carrier to form a solid image with an area ratio lower than 100%. Where V0 represents a white-region potential of the image carrier, VL represents an exposed-region potential of the image carrier, Vt represents a toner-layer potential, and Vd represents the development voltage, Vd≤0.5*(V0−VL)+VL−Vt is fulfilled.

5 Claims, 9 Drawing Sheets

IMAGE FORMING APPARATUS

INCORPORATION BY REFERENCE

This application is based on and claims the benefit of priority from Japanese Patent Application No. 2023-40503 filed on Mar. 15, 2023, the contents of which are hereby incorporated by reference.

BACKGROUND

The present disclosure relates to an image forming apparatus such as a copier, a printer, a facsimile machine, or the like employing an electrophotographic process, and in particular, relates to an image forming apparatus provided with a development device employing a nonmagnetic one-component development method.

As development devices for use in image forming apparatuses employing an electrophotographic method, such as copiers, printers, facsimile machines, and multifunction peripherals having functions of these apparatuses, there have been known a development device employing a two-component development method where both a toner and a carrier are used in a developer and a development device employing a one-component development method where a carrier is not used but only a toner is used.

In a development device employing the nonmagnetic one-component development method where a nonmagnetic toner is used, a regulation blade as a developer regulation member is disposed so as to contact a surface of a development roller that functions as a developer carrier. Toner is conveyed by fine irregularities provided on the surface of the development roller, and excess toner is scraped off by the regulation blade to form a thin layer of the toner. Further, when the toner passes under the regulation blade, the friction of the toner with the regulation blade and the surface of the development roller causes the toner to be charged. Then, a photosensitive body and the development roller are rotated in contact with each other, so that the toner on the surface of the development roller is developed on the photosensitive body by electric field.

In the nonmagnetic one-component development method where a direct-current voltage is used as a development voltage, if development is carried out without setting an area ratio of a solid image, the optimal development voltage that helps reduce image density unevenness is shifted as compared with a case of a half image of which an area ratio is set. As a result, if the image density unevenness of the half image is reduced, the image density unevenness of the solid image is disadvantageously emphasized, or if the image density unevenness of the solid image is reduced, the image density unevenness of the half image is disadvantageously emphasized.

SUMMARY

According to one aspect of the present disclosure, an image forming apparatus includes an image carrier, a charging device, an exposure device, a development device, and a development voltage power supply. The image carrier has a photosensitive layer on a surface thereof. The charging device charges the surface of the image carrier to a predetermined surface potential. The exposure device exposes the surface of the image carrier having been charged by the charging device, forming an electrostatic latent image by attenuating the charge. The development device includes a development container storing a nonmagnetic one-component developer composed only of a toner, a developer carrier that is pressed against the image carrier with a predetermined pressing force and on which a toner layer is formed by carrying the toner on an outer circumferential surface thereof, and a regulation blade that contacts the outer circumferential surface of the developer carrier to regulate a layer thickness of the toner layer formed on the outer circumferential surface of the developer carrier. The development device supplies the toner to the image carrier on which the electrostatic latent image has been formed. The development voltage power supply applies a development voltage to the developer carrier. The image forming apparatus alternately forms white regions and exposed regions at a predetermined pitch repeatedly on the surface of the image carrier to form a solid image with an area ratio lower than 100%. Where V0 represents a white-region potential of the image carrier, VL represents an exposed-region potential of the image carrier, Vt represents a toner-layer potential, and Vd represents the development voltage, expression (1) below is fulfilled:

$$Vd \leq 0.5*(V0 - VL) + VL - Vt. \quad (1)$$

DETAILED DESCRIPTION

1. Overall Configuration of Image Forming Apparatus 1

Figure 1:
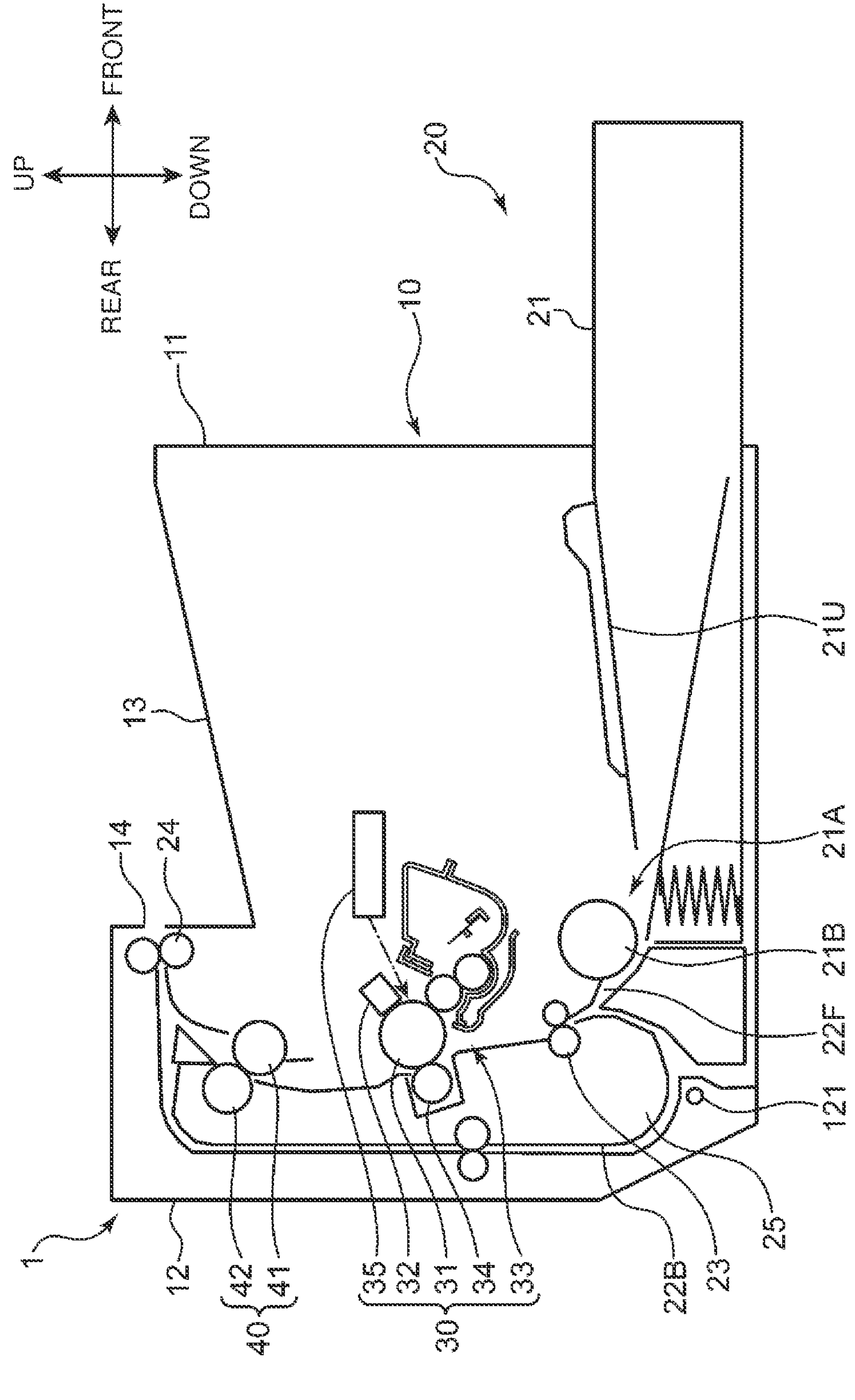
FIG. 1 is a side sectional view showing a schematic configuration of an image forming apparatus according to an embodiment of the present disclosure.

Hereinafter, an embodiment of the present disclosure will be described with reference to the accompanying drawings. FIG. 1 is a side sectional view showing a schematic configuration of an image forming apparatus 1 according to an embodiment of the present disclosure. Note that, in FIG. 1, the right side is the front side of the image forming apparatus 1, and the left side is the rear side of the image forming apparatus 1.

The image forming apparatus 1 (here, a monochrome printer) includes a main-body housing 10 having a substantially rectangular parallelepiped housing structure, and also includes a sheet feed portion 20, an image forming portion 30, and a fixing portion 40 housed in the main-body housing 10. The main-body housing 10 is provided with a front cover 11 and a rear cover 12 disposed on a front-face side and a rear-face side thereof, respectively. Further, on an upper surface of the main-body housing 10, there is provided a sheet discharge portion 13 to which a sheet is discharged after an image is formed on the sheet. Individual units of the image forming portion 30 can be taken in and out of the main-body housing 10 from an upper-surface side thereof by lifting the sheet discharge portion 13 to open an upper part of the main-body housing 10. Note that, in the following description, the term "sheet" refers to a sheet material, examples of which include copy paper, coated paper, an OHP sheet, a cardboard, a postcard, tracing paper, and other sheet materials to be subjected to an image forming process.

The sheet feed portion 20 includes a sheet feed cassette 21 that accommodates sheets to be subjected to the image forming process. The sheet feed cassette 21 partly protrudes frontward beyond the front face of the main-body housing 10. Of the sheet feed cassette 21, an upper surface of a part housed inside the main-body housing 10 is covered with a sheet feed cassette top plate 21U. The sheet feed cassette 21 is provided with a sheet storage space that accommodates a sheet bundle, a lift plate that lifts up the sheet bundle for sheet feeding, etc. The sheet feed cassette 21 is provided with a sheet feed-out portion 21A disposed at an upper part on a rear end side thereof. In this sheet feed-out portion 21A, a sheet feed roller 21B is disposed for feeding out sheets one by one from a topmost layer of the sheet bundle in the sheet feed cassette 21.

The image forming portion 30 performs an image forming operation, which is an operation of forming a toner image (a developer image) on a sheet fed out from the sheet feed portion 20. The image forming portion 30 includes a photosensitive drum 31, and also includes a charging portion 32, an exposure portion 35, a development portion 33, and a transfer roller 34, which are disposed around the photosensitive drum 31.

The photosensitive drum 31 (an image carrier) includes a rotation shaft and an outer circumferential surface (a drum main body) that rotates about the rotation shaft. The photosensitive drum 31 is constituted of a known organic photoconductor (OPC), for example, and has an outer circumferential surface constituted of a charge generation layer, a charge transport layer, etc. The photosensitive layer is uniformly charged by the charging portion 32, which will be described later, and is then irradiated with light by the exposure portion 35, as a result of which an electrostatic latent image is formed thereon by attenuating the charge; then a toner image, which is obtained by the development portion 33 visualizing the electrostatic latent image, is carried on the photosensitive layer.

The charging portion 32 (a charging device) is disposed with a predetermined gap with respect to the outer circumferential surface of the photosensitive drum 31, and uniformly charges the outer circumferential surface of the photosensitive drum 31 in a non-contact manner.

Figure 2:
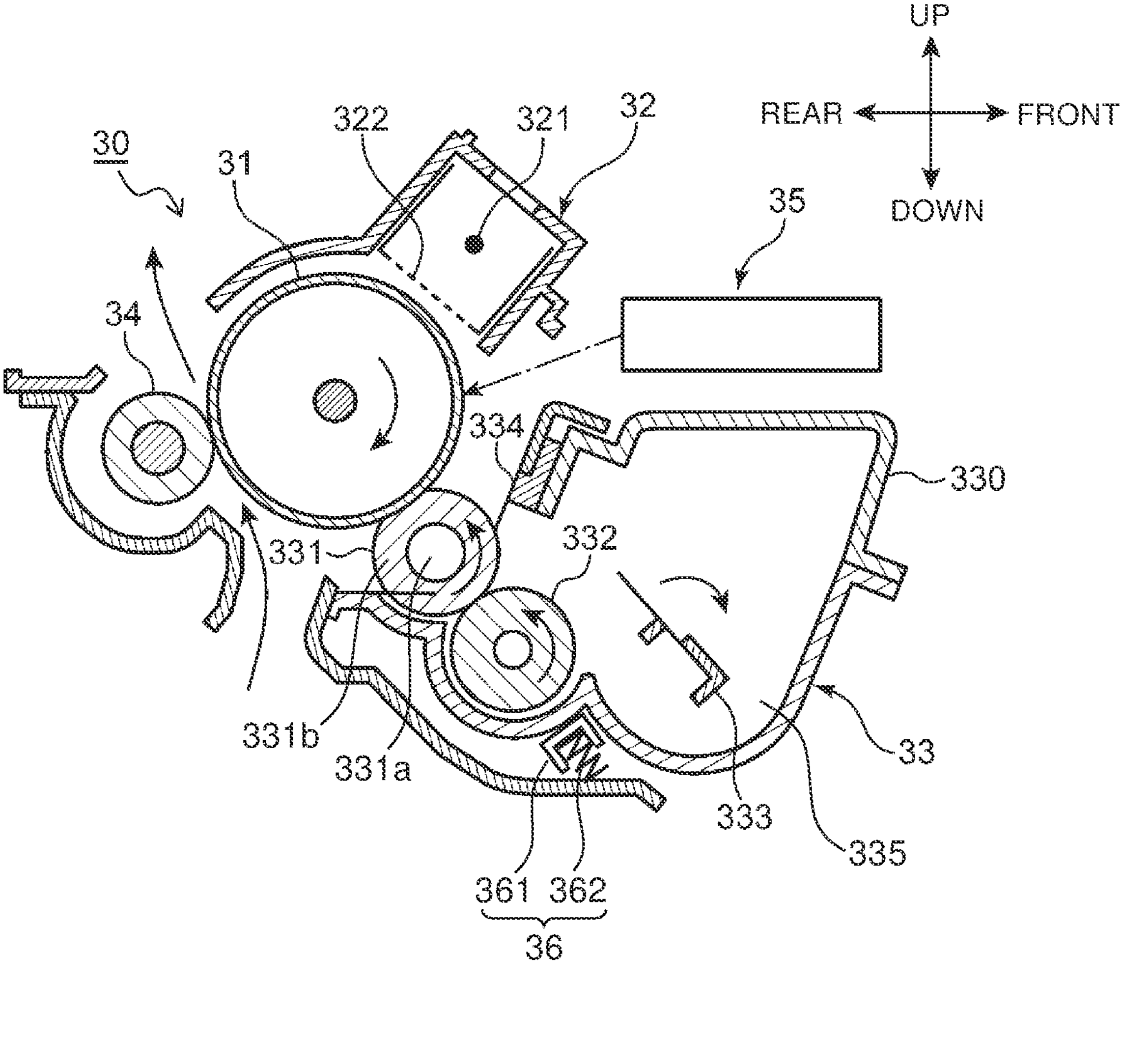
FIG. 2 is a side sectional view showing a schematic configuration of an image forming portion in the image forming apparatus of the present embodiment.

Specifically, the charging portion 32 includes a charging wire 321 and a grid electrode 322 (sec FIG. 2 for both). The charging wire 321 is a line-shaped electrode extending in a rotation-axis direction of the photosensitive drum 31, and generates a corona discharge between itself and the photosensitive drum 31. The grid electrode 322 is a grid-shaped electrode extending in the rotation-axis direction of the photosensitive drum 31, and is disposed between the charging wire 321 and the photosensitive drum 31. The charging portion 32 causes a current having a predetermined current value to flow through the charging wire 321 to thereby generate a corona discharge, and applies a predetermined voltage to the grid electrode 322 to thereby charge the outer circumferential surface of the photosensitive drum 31, which faces the grid electrode 322, uniformly to a predetermined surface potential.

The exposure portion 35 (an exposure device) includes a laser light source and optical devices such as a mirror and a lens, and irradiates the outer circumferential surface of the photosensitive drum 31 with light modulated based on image data received from an external device such as a personal computer. In this manner, on the outer circumferential surface of the photosensitive drum 31, the exposure portion 35 forms an electrostatic latent image corresponding to an image that is based on the image data.

The development portion 33 (a development device), which is detachably attached inside the main-body housing 10, supplies the outer circumferential surface of the photosensitive drum 31 with a nonmagnetic one-component toner (developer), and thereby develops the electrostatic latent image formed on the outer circumferential surface of the photosensitive drum 31. To develop an electrostatic latent image means to form a toner image (a developer image) into which the electrostatic latent image is visualized. A detailed configuration of the development portion 33 will be described later.

The transfer roller 34 is a roller for transferring a toner image formed on the outer circumferential surface of the photosensitive drum 31 onto a sheet. Specifically, the transfer roller 34 has an outer circumferential surface that rotates about a shaft and that faces the outer circumferential surface of the photosensitive drum 31 at a position downstream of a development roller 331 in a rotation direction of the photosensitive drum 31. The transfer roller 34 transfers the toner image carried on the outer circumferential surface of the photosensitive drum 31 onto a sheet passing through a nip portion between itself and the outer circumferential surface of the photosensitive drum 31. During the transfer, a transfer voltage having a polarity reverse to that of the toner is applied to the transfer roller 34.

The fixing portion 40 performs a fixing process of fixing the toner image, which has been transferred to a sheet, onto the sheet. The fixing portion 40 includes a fixing roller 41 and a pressure roller 42. The fixing roller 41 is provided with a heat source disposed inside thereof, and heats the toner image having been transferred onto the sheet at a predetermined temperature. The pressure roller 42 is pressed against the fixing roller 41 so as to form a fixing nip portion between itself and the fixing roller 41. When the sheet having a toner image transferred thereon is passed through the fixing nip portion, the toner image is fixed on the sheet by means of heating by the fixing roller 41 and pressurization by the pressure roller 42.

Inside the main-body housing 10, a main conveyance path 22F and a reverse conveyance path 22B are provided for conveying a sheet. The main conveyance path 22F extends from the sheet feed-out portion 21A of the sheet feed portion 20, via the image forming portion 30 and the fixing portion 40, up to a sheet discharge port 14 provided facing a sheet discharge portion 13 on the upper surface of the main-body housing 10. The reverse conveyance path 22B is a conveyance path for, in a case where double-sided printing is to be performed with respect to a sheet, returning the sheet to an upstream side of the image forming portion 30 in the main conveyance path 22F after printing has been performed on one side of the sheet.

The main conveyance path 22F is formed to extend upward from below so as to pass through a transfer nip portion formed by the photosensitive drum 31 and the transfer roller 34. Further, a pair of registration rollers 23 are disposed upstream of the transfer nip portion in the main conveyance path 22F. A sheet is temporarily stopped by the pair of registration rollers 23 for skew correction, and then fed out to the transfer nip portion at predetermined timing for image transfer. A plurality of conveyance rollers for conveying a sheet are disposed at appropriate positions in the main conveyance path 22F and the reverse conveyance path 22B. A pair of sheet discharge rollers 24 are disposed near the sheet discharge port 14.

The reverse conveyance path 22B is formed between an outer surface of a reverse unit 25 and an inner surface of the rear cover 12 of the main-body housing 10. Note that, on an inner surface of the reverse unit 25, the transfer roller 34 and one roller of the pair of registration rollers 23 are mounted. The rear cover 12 and the reverse unit 25 are each rotatable about an axis of a fulcrum portion 121 provided at a lower end of them. If jam (paper jamming) occurs in the reverse conveyance path 22B, the rear cover 12 is opened. If jam occurs in the main conveyance path 22F, or when a unit of the photosensitive drum 31 or the development portion 33 is to be taken out, the reverse unit 25 is opened as well as the rear cover 12.

2. Configuration of Image Forming Portion 30

Figure 3:
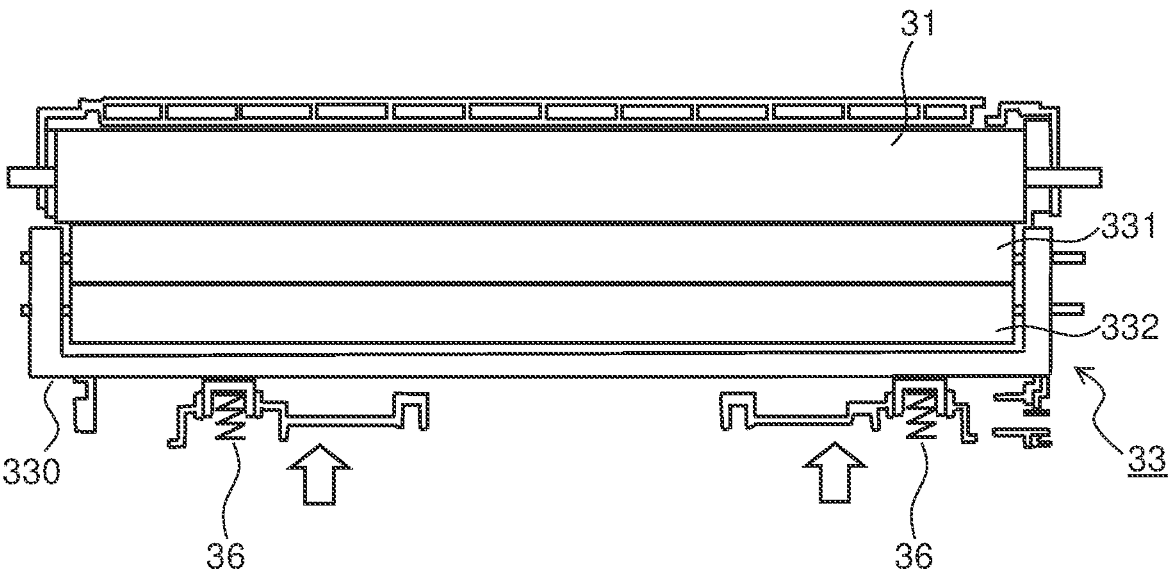
FIG. 3 is a plan view of and around a contact region between a photosensitive drum and a development roller of a development portion as seen from above.
Figure 4:
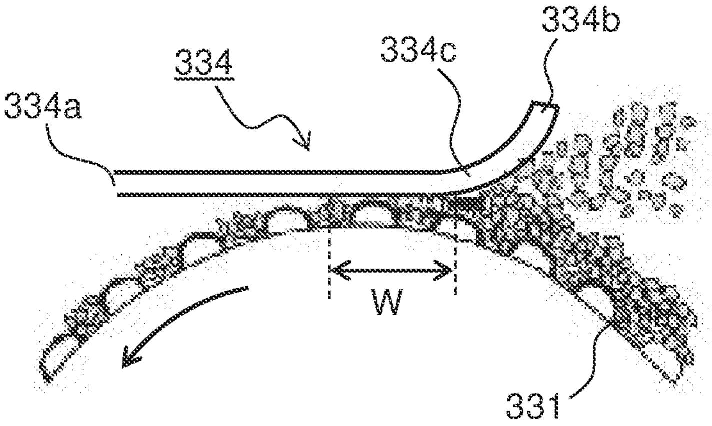
FIG. 4 is an enlarged sectional view of and around a contact region between the development roller and a regulation blade in the development portion.
Figure 5:
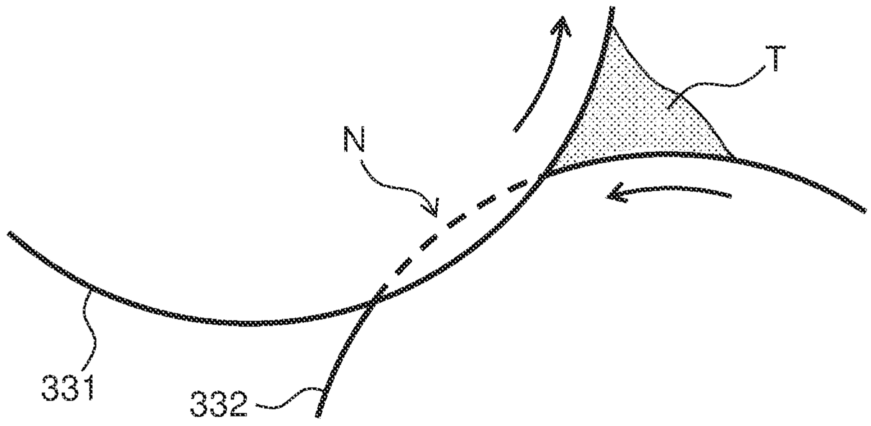
FIG. 5 is an enlarged sectional view of an abutment region between the development roller and a supply roller.

FIG. 2 is a sectional view of the image forming portion 30 in the image forming apparatus 1 of the present embodiment. FIG. 3 is a plan view of and around a contact region between the photosensitive drum 31 and the development roller 331 of the development portion 33 as seen from above. FIG. 4 is an enlarged sectional view of and around a contact region between the development roller 331 and the regulation blade 334 in the development portion 33. FIG. 5 is an enlarged sectional view of an abutment region between the development roller 331 and the supply roller 332.

As shown in FIG. 2 and FIG. 3, the development portion 33 includes a development housing 330 (a development container), the development roller 331 (a developer carrier), the supply roller 332, a stir paddle 333, and the regulation blade 334.

The development housing 330 contains a nonmagnetic one-component developer composed of a toner alone, and houses the development roller 331, the supply roller 332, the regulation blade 334, and the like. The development housing 330 includes a stir chamber 335 in which the developer (the toner) is contained in a stirred state. Inside the stir chamber 335, the stir paddle 333 is disposed. The stir paddle 333 stirs the toner inside the stir chamber 335.

The development roller 331 includes a rotation shaft 331*a* and a roller portion 331*b*. The rotation shaft 331*a* is rotatably supported by a bearing portion (not shown) of the development housing 330. The roller portion 331*b* is a cylinder-shaped member layered over an outer circumferential surface of the rotation shaft 331*a*, and is composed of a base rubber (e.g., silicone rubber) and an uneven coat layer formed of a coting material such as urethane layered over the base rubber. The roller portion 331*b* rotates integrally with the rotation shaft 331*a* as the rotation shaft 331*a* rotates. On a surface of the roller portion 331*b*, a toner layer (a developer layer) is formed with a predetermined layer thickness. The toner layer has its layer thickness regulated (uniformly adjusted to a predetermined thickness) by the regulation blade 334, which will be described later. The toner layer is charged with static electricity generated by abutment (friction) between the regulation blade 334 and the roller portion 331*b*.

The development roller 331 rotates, at a position facing the photosensitive drum 31, in a direction (a counter clockwise direction in FIG. 2) that is from an upstream side toward a downstream side in the rotation direction of the photosensitive drum 31 (a clockwise direction in FIG. 2). That is, at the position facing the photosensitive drum 31, the development roller 331 rotates in the same direction as the photosensitive drum 31.

The supply roller 332 is disposed so as to face the development roller 331. The supply roller 332 holds the developer contained in the stir chamber 335 on an outer circumferential surface thereof. Further, the supply roller 332 supplies the developer held on the outer circumferential surface thereof to the development roller 331.

The supply roller 332 rotates, at a position facing the development roller 331, in a direction (the counterclockwise direction in FIG. 2) from a downstream side to an upstream side in a rotation direction of the development roller 331 (the counterclockwise direction in FIG. 2). That is, at the position facing the development roller 331, the supply roller 332 rotates in a direction reverse to the rotation direction of the development roller 331. To move the toner from the supply roller 332 to the development roller 331, a predetermined supply voltage (a direct-current voltage) may be applied to the supply roller 332.

The development roller 331 receives a supply of the developer from the supply roller 332, and holds a toner layer on the outer circumferential surface thereof. Then, the development roller 331 supplies the developer to the photosensitive drum 31. The development roller 331 and the supply roller 332 are substantially equal to the photosensitive drum 31 in axial length (in a direction orthogonal to the plane of FIG. 2). To move the toner from the development roller 331 to the photosensitive drum 31, a predetermined development voltage (a direct-current voltage) is applied to the development roller 331.

In the image forming portion 30, on a side (a lower right side in FIG. 2, a lower side in FIG. 3) opposite from the photosensitive drum 31 across the development housing 330, a pressing mechanism 36 is disposed which is composed of a pressing member 361 and a pressing spring 362. The pressing mechanism 36 is disposed one at each of two positions in a longitudinal direction of the development housing 330 (two positions each at 85 mm from an axial center of the photosensitive drum 31). With the development portion 33 mounted in the image forming portion 30, the pressing member 361 is pressed against the development housing 330 to be pressed in a direction (a left-upward direction in FIG. 2, an upward direction in FIG. 3) of approaching the photosensitive drum 31, such that the development roller 331 is pressed against the photosensitive drum 31 with a predetermined pressing force. Note that, in the present embodiment, neither the development portion 33 nor the photosensitive drum 31 has no mechanism to regulate a distance between the development roller 331 and the photosensitive drum 31, that is, no mechanism to regulate the pressing force of the development roller 331 with respect to the photosensitive drum 31. However, there may be provided a mechanism that regulates the pressing force of the development roller 331 with respect to the photosensitive drum 31.

The regulation blade 334 is a thin-plate-shaped metal member. The regulation blade 334 is configured such that a base end portion 334*a* is fixed to the development housing 330, and that a leading end portion 334*b* is a free end. The regulation blade 334 contacts the outer circumferential surface of the development roller 331 at a position, in the rotation direction of the development roller 331, upstream of the position at which the photosensitive drum 31 and the development roller 331 face each other.

The regulation blade 334 is flexibly deformable, and in a circumferential direction of the development roller 331, a contact region (a regulation nip) exists between the regulation blade 334 and the development roller 331. The regulation blade 334 abuts the outer circumferential surface of the development roller 331 (the roller portion 331*b*) with a predetermined regulation pressure and a regulation nip width W. Note that, as will be described later, a predetermined regulation voltage (a direct-current voltage) may be applied to the regulation blade 334.

The regulation blade 334 is formed of a material such as stainless steel (SUS304), for example, and in the present embodiment, the regulation blade 334 has a free length of 10 mm. The leading end portion 334*b* of the regulation blade 334 is subjected to bending, and thereby a bent portion 334*c* is formed. This bent portion 334*c* abuts the outer circumferential surface of the development roller 331. The bent portion 334*c* has a curvature radius of 0.1 mm or larger.

As shown in FIG. 4, the regulation blade 334 abuts the development roller 331 with a constant regulation pressure (contact line pressure), and thereby, the toner layer carried on the outer circumferential surface of the development roller 331 is adjusted to a uniform thickness. In this manner, the regulation blade 334 regulates the amount of toner on the outer circumferential surface of the development roller 331. Further, the regulation blade 334 rubs the toner carried on the outer circumferential surface of the development roller 331, and thereby charges the toner. The contact line pressure of the regulation blade 334 with respect to the development roller 331 is a contact pressure of the regulation blade 334 per unit length at the position of contact between the regulation blade 334 and the outer circumferential surface of the development roller 331.

As shown in FIG. 5, at the abutment region (a supply nip N) between the development roller 331 and the supply roller 332, the development roller 331 bites into the supply roller 332. Further, at a position downstream of the supply nip N with respect to the rotation direction of the development roller 331 (in FIG. 5, on an upper right side), a toner accumulation T is formed.

It is known that if the development roller 331 and the supply roller 332 are in line contact with each other, the toner accumulation T is not formed and toner supply performance is significantly degraded. To prevent this, it is necessary to design a center distance between the development roller 331 and the supply roller 332, their diameters, and their hardnesses such that the development roller 331 and the supply roller 332 have an appropriate biting amount. The development roller 331, which contacts the photosensitive drum 31 which is a hard member, is designed to have an Asker-C hardness of the order of 50 to 80. Thus, to allow the development roller 331 to bite into the supply roller 332, it is necessary to give the supply roller 332 a lower hardness than the development roller 331.

By generating a potential difference between the supply roller 332 and the development roller 331, electric field energy is generated in a direction in which the toner moves from the supply roller 332 to the development roller 331. Further, Van der Waals force acts among particles of the toner regardless of the potential difference. By means of this electric field energy and the Van der Waals force, the toner is supplied from the supply roller 332 to the development roller 331. For improved solid-image density followability (absence of difference in density between leading and rear ends of an image), it is also important to set an optimal range of compressive load, which is a force with which the supply roller 332 is pressed against the development roller 331.

3. Control Path of Image Forming Apparatus 1

Figure 6:
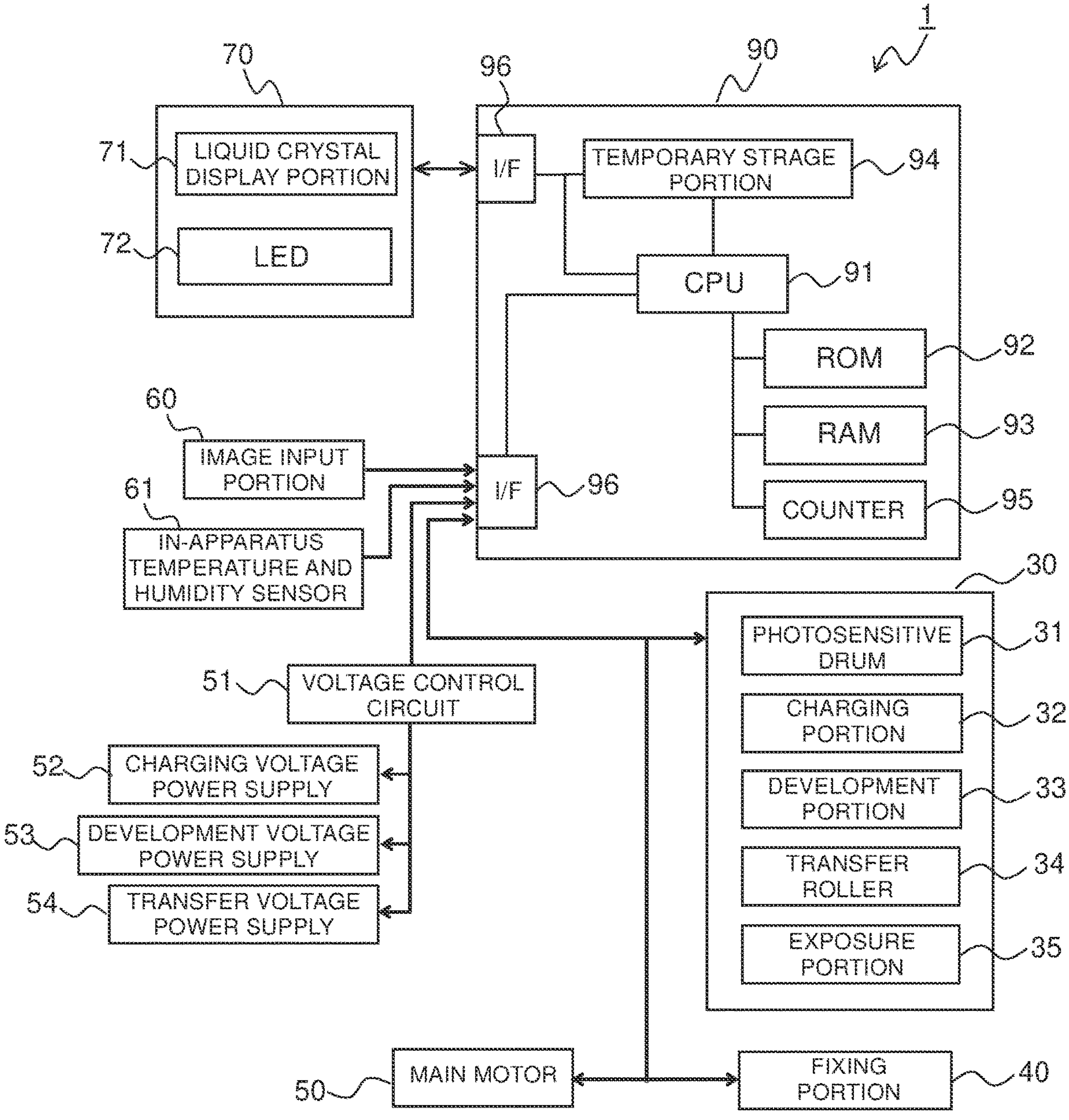
FIG. 6 is a block diagram showing an example of a control path used in the image forming apparatus of the present embodiment.

FIG. 6 is a block diagram showing one example of a control path used in the image forming apparatus 1 of the present embodiment. Note that the image forming apparatus 1 is used with various controls executed on its respective portions, and this results in a complex control path of the entire image forming apparatus 1. Hence, the description here will be focused on necessary part of the control path for implementation of the present disclosure.

A main motor 50, according to an output signal from a control portion 90, drives the sheet feed roller 21B, the photosensitive drum 31, three components of the development roller 331, the supply roller 332, and the stir paddle 333 inside the development portion 33, the fixing roller 41 inside the fixing portion 40, and the like to rotate at a predetermined rotation speed.

A voltage control circuit 51 is connected to a charging voltage power supply 52, a development voltage power supply 53, and a transfer voltage power supply 54, and, according to the output signal from the control portion 90, the voltage control circuit 51 causes these power supplies to operate. According to a control signal from the voltage control circuit 51, the charging voltage power supply 52 applies a charging voltage to the charging wire 321 inside the charging portion 32. The development voltage power supply 53 applies a development voltage to the development roller 331 inside the development portion 33, and applies a supply voltage to the supply roller 332. In a case where a regulation voltage is applied to the regulation blade 334 inside the development portion 33, the development voltage power supply 53 applies the regulation voltage to the regulation blade 334. The transfer voltage power supply 54 applies a transfer voltage to the transfer roller 34.

An image input portion 60 is a receiving portion that receives image data transmitted to the image forming apparatus 1 from a personal computer or the like. An image signal received from the image input portion 60 is converted into a digital signal, which is then transmitted to a temporary storage portion 94.

An in-apparatus temperature humidity sensor 61 is a sensor for sensing temperature and humidity inside the image forming apparatus 1, in particular, temperature and humidity around the development portion 33, and is disposed near the image forming portion 30.

An operation portion 70 is provided with a liquid crystal display portion 71 and LEDs 72 for indicating various states, such that the state of the image forming apparatus 1 is indicated and the conditions of image formation and the number of copies printed are shown on the operation portion 70. Various settings for the image forming apparatus 1 are made via a printer driver of the personal computer.

The control portion 90 includes at least a central processing unit (CPU) 91, a read only memory (ROM) 92 which is a storage portion dedicated to reading, a random access memory (RAM) 93 which is a readable and writable storage portion, the temporary storage portion 94 which temporarily stores image data and the like, a counter 95, and a plurality of (here, two) interfaces (I/Fs) 96 which transmit control signals to respective devices inside the image forming apparatus 1 and receive input signals from the operation portion 70.

The ROM 92 stores a control program for the image forming apparatus 1, data that stays unchanged during use of the image forming apparatus 1 such as numerical values necessary for controlling the image forming apparatus 1, and the like. The RAM 93 stores necessary data generated during control of the image forming apparatus 1, data temporarily required for controlling the image forming apparatus 1, and the like.

The temporary storage portion 94 temporarily stores an image signal that is input via the image input portion 60 which receives image data transmitted from a personal computer or the like, and that is converted into a digital signal. The counter 95 cumulatively counts the number of printed sheets.

Further, the control portion 90 transmits control signals to respective portions and devices in the image forming apparatus 1 from the CPU 91 via the I/Fs 96. Further, the respective portions and devices transmit signals indicating their states and input signals to the CPU 91 via the I/Fs 96. Examples of portions and devices controlled by the control portion 90 include the image forming portion 30, the fixing portion 40, the main motor 50, the voltage control circuit 51, the image input portion 60, the operation portion 70, etc.

4. Setting of Image Forming Portion in Image Forming Operation

Figure 7:
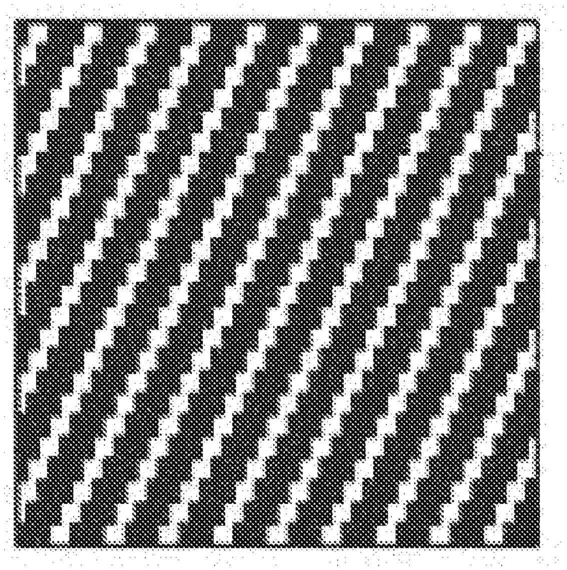
FIG. 7 is a diagram showing a line screen with an area ratio of 60% used to form a solid image.
Figure 8:
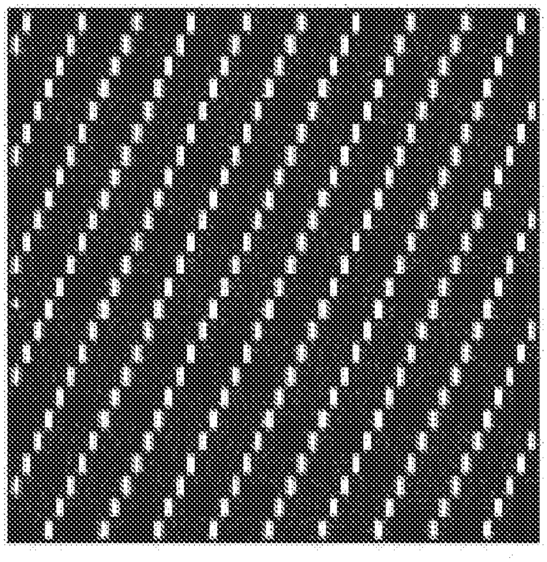
FIG. 8 is a diagram showing a line screen with an area ratio of 80% used to form a solid image.
Figure 9:
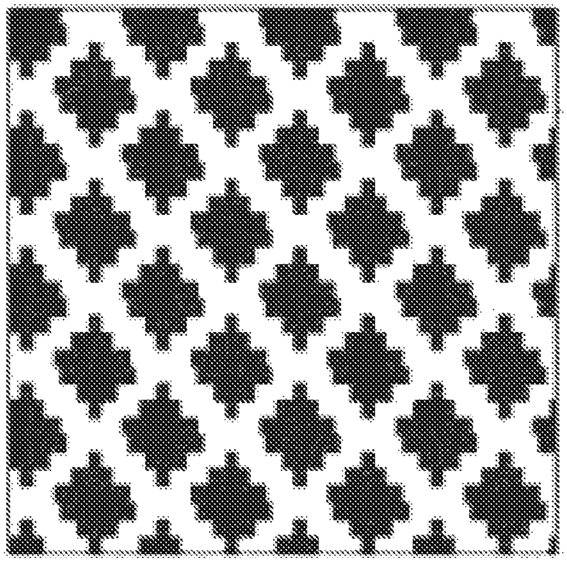
FIG. 9 is a diagram showing a dot screen used to form a solid image.

Hereinafter, a description will be given of the setting of the development portion 33 during image forming operation (development). The setting of the development portion 33 is a characterizing portion of the image forming apparatus 1 of the present embodiment. In the present embodiment, a solid image is formed with a high area ratio that is lower than 100%. Formation of a solid image with a high area ratio is performed by using a screen, for example. As the screen, a line screen and a dot screen are both usable. Screen examples are shown in FIG. 7 to FIG. 9. FIGS. 7 and 8 show line screens with area ratios of 60% and 80%, respectively, and FIG. 9 shows a dot screen. Note that, instead of using a screen, a solid image with a high image ratio may be formed by using error diffusion where white and exposed regions are formed in a random manner.

Figure 10:
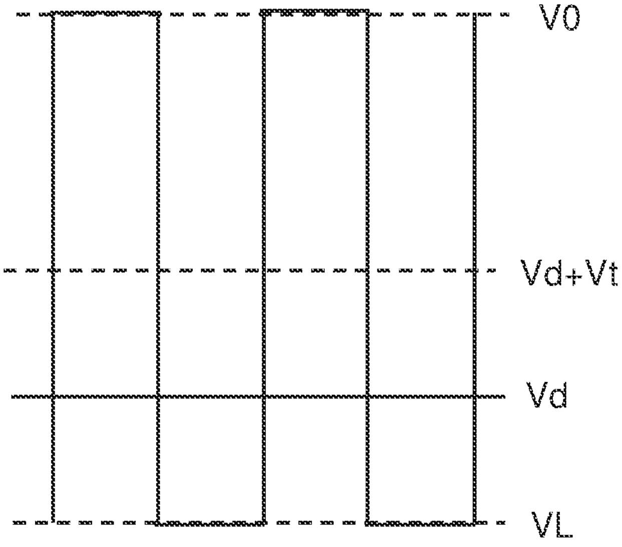
FIG. 10 is a diagram showing a relationship among surface potentials V0 and VL of the photosensitive drum, a development voltage Vd, and a toner-layer potential Vt during formation of a solid image by using a screen.

FIG. 10 is a diagram showing a relationship, during formation of a solid image by using a screen, among surface potentials V0 and VL of the photosensitive drum 31, a development voltage Vd, and a toner-layer potential Vt. In a case of forming a solid image and a half image by using a screen, as shown in FIG. 10, the surface potential of the photosensitive drum 31 varies between a white region (background region) potential V0 and an exposed region (image region) potential VL in a waveform like an alternate-current (AC) waveform. Note that, in a case where error diffusion is used to form a solid image and a half image, the surface potential does not vary regularly as in FIG. 10, but varies with irregular widths between V0 and VL.

In FIG. 10, when a sum (Vd+Vt) of the development voltage Vd and the toner-layer potential Vt is equal to an intermediate potential between the white-region potential V0 and the exposed-region potential VL, it becomes more easy for the toner to move between the photosensitive drum 31 and the development roller 331, and this helps correct uneven image density most effectively.

Figure 11:
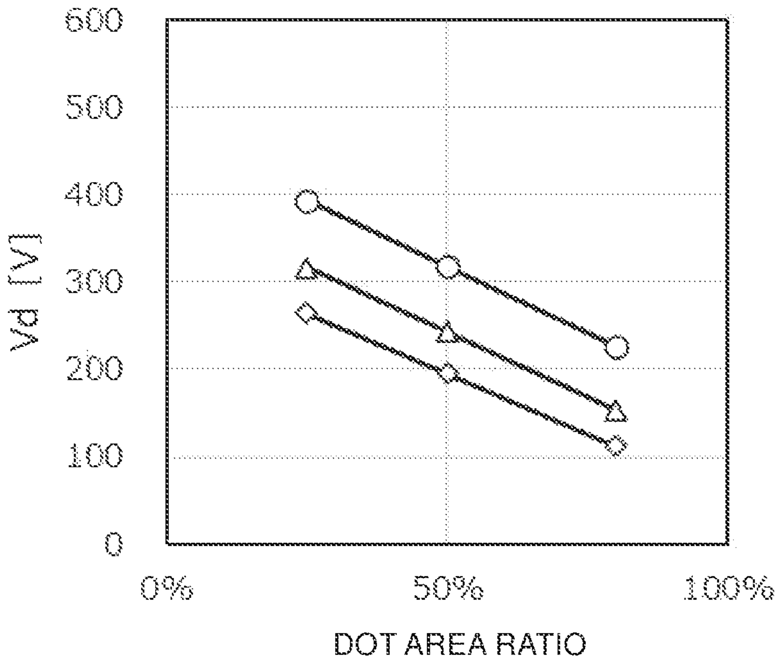
FIG. 11 is a graph showing an optimal value of the development voltage Vd calculated from an area ratio (a dot area ratio) of a case where a dot screen is used.

FIG. 11 is a graph showing an optimal value of the development voltage Vd calculated from an arca ratio (a dot area ratio) of a case where a dot screen is used. As shown in FIG. 11, the optimal value of the development voltage Vd becomes smaller as the area ratio becomes lower. Further, the optimal value of the development voltage becomes smaller in the order of a high-temperature high-humidity environment (an HH environment, 32.5° C., 80% RH, a circle data series in the figure), a normal-temperature normal-humidity environment (an NN environment, 25° C., 50% RH, a triangle data series in the figure), and a low-temperature low-humidity environment (an LL environment, 10° C., 10% RH, a diamond data series in the figure). The tendency shown in FIG. 11 is also observed in the case where the line screen as shown in FIG. 7 or FIG. 8 is used and in the case where error diffusion is used.

Hence, in the present embodiment, voltage setting is made by comparing the variation of the surface potential of the photosensitive drum 31 to the alternate-current (AC) waveform as shown in FIG. 10, thereby suppressing image density unevenness in a solid image and a half image formed by using a screen. Specifically, environment correction is performed by controlling the development voltage Vd such that the following expression (1) is fulfilled, where the white region (background region) potential and the exposed region (image region) potential of the photosensitive drum 31 are respectively represented by V0 and VL, the toner-layer potential is represented by Vt, and the development voltage is represented by Vd:

$$Vd \leq 0.5*(V0-VL)+VL-Vt. \tag{1}$$

0.5*(V0–VL)+VL on the right-hand side of expression (1) represents the intermediate potential between the white-region potential V0 and the exposed-region potential VL. Transposition of –Vt on the right-hand side of expression (1) to the left-hand side results in Vd+Vt≤0.5*(V0–VL)+VL, which indicates that the sum (Vd+Vt) of the development voltage Vd and the toner-layer potential Vt is equal to or less than the intermediate potential between the white-region potential V0 and the exposed-region potential VL.

The toner-layer potential Vt can be obtained by measuring a surface potential of the toner layer while driving the development portion 33 with the development roller 331 and the supply roller 332 grounded (earthed).

The right-hand side of the expression (1) calculates an optimal development voltage Vd for a case of forming a half image with an area ratio of 50%, and in a case of forming a solid image, the area ratio is preferably 70 to 80%. Thus, as is clear from FIG. 11 as well, by setting such that the development voltage Vd is smaller than the value of the right-hand side of expression (1), it becomes easier to suppress image density unevenness both in a solid image and in a half image. Accordingly, by setting such that the white-region potential V0, the exposed-region potential VL, the toner-layer potential Vt, and the development voltage Vd fulfill expression (1), it is possible to perform image formation where image density unevenness is suppressed both in a solid image and in a half image. Further, it is also possible to form a solid image with an arca ratio of 40 to 80%.

Note that, in a case of an arca ratio lower than 50%, a setting exceeding the calculated optimal development voltage Vd remarkably aggravates the image density unevenness, whereas the image density unevenness is not so much aggravated on a side where the development voltage Vd is low. Thus, it is preferable not to raise the development voltage Vd very much, and even in a case of a half image with an area ratio that is 50% or lower, there is no problem with the setting according to expression (1).

Further, when the development roller 331 has a resistance that is 8.0 log(2 or higher, it becomes more likely for a supply assist voltage to be generated, part of the supply voltage applied to the supply roller 332 contributing to development (supply of the toner to the photosensitive drum 31). Thus, when the resistance of the development roller 331 is 8.0 log Ω or higher, in a case of applying, to the supply roller 332, a supply voltage that is different from the development voltage Vd, it is preferable to perform environment correction by controlling the development voltage Vd such that the following expression (2) is fulfilled, where the supply assist voltage, in the supply voltage, contributing to development is represented by Vs:

$$Vd \le 0.5 * (V0 - VL) + VL - Vt - Vs. \quad (2)$$

Figure 12:
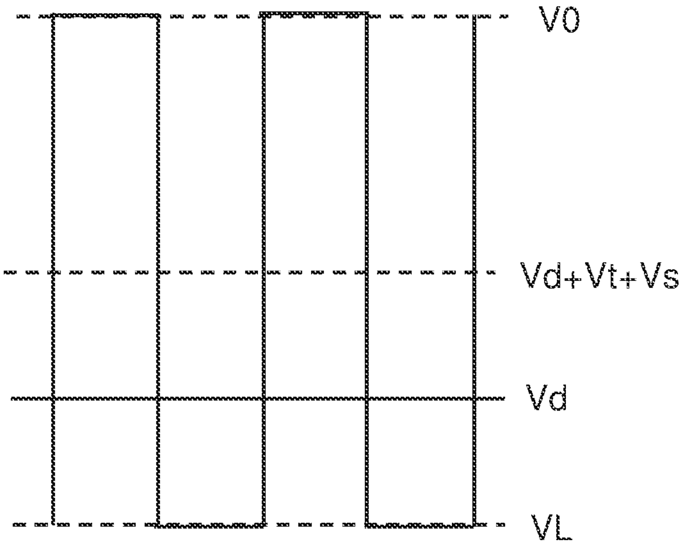
FIG. 12 is a diagram showing a relationship among the surface potentials V0 and V1 of the photosensitive drum, the development voltage Vd, the toner-layer potential Vt, and a supply assist voltage Vs during formation of a solid image by using a screen.

FIG. 12 is a diagram showing a relationship among the surface potentials V0 and V1 of the photosensitive drum 31, the development voltage Vd, the toner-layer potential Vt, and a supply assist voltage Vs during formation of a solid image by using a screen. In FIG. 12, in a case where a sum (Vd+Vt+Vs) of the development voltage Vd, the toner-layer potential Vt, and the supply assist voltage Vs is equal to the intermediate voltage between the white-region potential V0 and the exposed-region potential VL, it becomes easier for the toner to move between the photosensitive drum 31 and the development roller 331, and this helps correct uneven image density most effectively.

By setting such that the development voltage Vd is smaller than the value of the right-hand side of expression (2), even in a case where the supply assist voltage Vs has an effect on the development voltage Vd, it is possible to perform image formation by effectively suppressing image density unevenness both in a solid image and in a half image. Regarding the supply assist voltage Vs, with the development roller 331 grounded (earthed) and the supply voltage applied to the supply roller 332, by measuring the surface potential of the toner layer while driving the development portion 33, the surface potential of the toner layer is calculated as Vt+Vs.

Furthermore, in terms of suppressing occurrence of thin layer streaks, it is preferable that a toner conveyance amount of the development roller 331 be large to some extent. Thus, it is preferable to set the toner conveyance amount of the development roller 331 to 5 to 10 g/m$^2$, and to set such that Vd−VL≤100 is fulfilled at least in low-humidity environments (50% RH or lower). By thus setting the toner conveyance amount and Vd−VL, it is possible to suppress not only normal image density unevenness but also image density unevenness due to development ghost.

5. Image Evaluation Based on Setting of Development Portion

Hereinafter, a description will be given of image evaluation results of cases where the development portion 33 is set as in the present embodiment. As a testing apparatus, the image forming apparatus 1 (manufactured by KYOCERA Document Solutions Inc.) as shown in FIG. 1 was used.

Used as the development roller 331 was a roller including a rotation shaft 331*a* with a shaft diameter of 6 mm and a roller portion 331*b* that had a silicone rubber layer with a layer thickness of 3.5 mm as a base material layer, on which a coating was formed, and that had an outer diameter of 13 mm and an axial length of 232 mm, and the roller had an Asker-C hardness of 55°. The coating was created by adding one part by weight of a carbon black or a quaternary ammonium salt to 100 parts by weight of a copolymerized nylon resin; it was applied to a thickness of 5 μm, and was adjusted to achieve a roller resistance of 8 to 11 log Ω. The roller resistance was measured by applying a load F of 1 kg to a metal roller M to bring it into contact with the development roller 331 to stop the development roller 331, and then applying a direct-current voltage of 100 V between the development roller 331 and the metal roller M.

As the photosensitive drum 31, a positively-charged single-layer OPC photosensitive drum (manufactured by KYOCERA Document Solutions Inc.) was used which had an outer diameter of 24 mm and a photosensitive-layer thickness of 22 μm.

Relationship Between Vd−VL and Development Ghosts

A study was conducted regarding the value of Vd−VL and development ghosts. A plurality of the image forming apparatuses 1 were prepared, in each of which the development portion 33 was filled with the toner. By using these image forming apparatuses 1, by varying Vd−VL in the low-temperature low-humidity environment (the LL environment, 10° C., 10% RH), the normal-temperature normal-humidity environment (the NN environment, 25° C., 50% RH), and the high-temperature high-humidity environment (the HH environment, 32.5° C., 80% RH), visual inspection was conducted for a development ghost each time a test image was output.

Evaluation of the test image, which was a chart having a solid patch image in its leading head part and a halftone image following the solid patch image, was conducted based on whether or not a development ghost of the solid patch image had occurred in the halftone part. In the evaluation criteria, a test image with no occurrence of development ghost was marked as "Good", a test image where a development ghost was observed but was within an acceptable range was marked as "Fair", and a test image where a development ghost was observed and was deemed unacceptable was marked as "Poor". The results are shown in Table 1.

TABLE 1

| | Development Ghost | |
|---|---|---|
| Vd − VL | ≤100 | >100 |
| LL Environment | Good | Poor |
| NN Environment | Good | Fair |
| HH Environment | Good | Good |

As shown in Table 1, in cases of Vd−VL≤100, no development ghost occurred in any of the LL environment, the NN environment, and the HH environment. On the other hand, in cases of Vd−VL>100, no development ghost occurred in the HH environment, but in the NN environment, a ghost occurred although in an acceptable range, and in the LL environment, a development ghost of an unacceptable level occurred.

From the above results, it has been confirmed that, by setting such that Vd−VL≤100, it is possible to effectively suppress image density unevenness due to a development ghost even in the NN environment and in the LL environment.

6 Other Configurations

Figure 13:
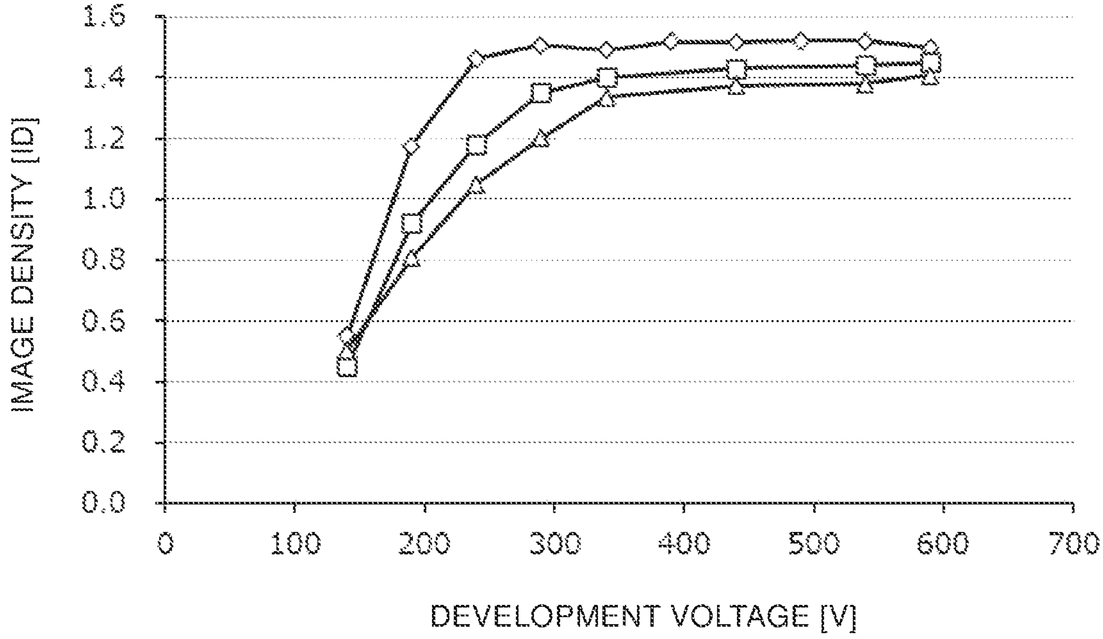
FIG. 13 is a graph showing a relationship between the development voltage applied to the development roller and image density when surface free energy of the development roller is changed.

FIG. 13 is a graph showing a relationship between the development voltage applied to the development roller and image density (ID) when surface free energy of the development roller 331 is changed. The surface free energy, which is equivalent to the surface tension in liquids, represents the energy of molecules on the surface of a solid itself. In FIG. 13, a case where the surface free energy of the development roller 331 was 12 $mJ/m^2$ is represented by a diamond data series, a case of 21 $mJ/m^2$ is represented by a square data series, and a case of 30 $mJ/m^2$ is represented by a triangle data series.

As shown in FIG. 13, there is a tendency such that the higher the surface free energy of the development roller 331 is, the narrower a usable range OW of the development voltage becomes. This is because as the surface free energy of the development roller 331 becomes higher, an upper limit value of pressing force of the development roller 331 with which a white void occurs in a halftone image becomes lower. The surface free energy of the development roller 331 is preferably 5 $mJ/m^2$ or more but 27 $mJ/m^2$ or less.

Further, the amount of toner regulated by the regulation blade 334 changes depending on a contact area ratio of the outer circumferential surface of the development roller 331. The contact area ratio of the outer circumferential surface of the development roller 331 is a proportion that an area of a region in the outer circumferential surface of the development roller 331 excluding a recessed part (a non-contact part) occupies in the area of the outer circumferential surface of the development roller 331. That is, the contact area ratio of a circumferential surface of the development roller 331 is a ratio that represents a true contact area, with respect to an apparent contact area, between the outer circumferential surface of the development roller 331 and the regulation blade 334. The contact area ratio is preferably 4.5 to 10%, and more preferably 6 to 8%.

The regulation pressure of the regulation blade 334 is preferably 10 to 60 N/m, and more preferably 20 to 40 N/m.

Further, in the present embodiment, a toner (a pulverized toner) produced by a pulverization method and a toner (a polymerized toner) produced by a polymerization method are both usable. The polymerized toner, which has a true spherical shape with a high circularity degree and thus is low in adhesion, has high developing performance and thus has a wide usable range OW. Thus, the present disclosure is particularly effective in a nonmagnetic one-component development method using the pulverized toner which is lower in cost than the polymerized toner.

Further, in the present embodiment, it has been confirmed that a preferable result can be obtained with a toner having a center particle diameter of 6.0 to 8.0 μm. This center particle diameter range is chosen because center particle diameters less than 6.0 μm undesirably lead to increase in toner production cost, and center particle diameters more than 8.0 μm undesirably lead to an increase in toner consumption and thus to a decrease in fixation performance of the toner.

Further, in the present embodiment, it has been confirmed that a preferable result can be obtained with a toner having a circularity degree of 0.93 to 0.97. With circularity degrees of 0.93 or lower, image quality tends to be degraded, which is undesirable. With circularity degrees of 0.97 or higher, production cost increases significantly, which is also undesirable.

Further, in the present embodiment, it has been confirmed that a preferable result can be obtained with a toner of which a melt viscosity at 90° C. is 100,000 Pa·s or less. A toner of which a melt viscosity at 90° C. is above 100,000 Pa·s has inadequate fixation performance and thus is not preferable in terms of energy saving.

Further, it has been confirmed that a preferable result can be obtained when, of the photosensitive drum 31, the white-region potential V0 is in the range of 500 to 800 V, and the exposed-region potential VL is in the range of 70 to 200 V.

It should be understood that the present disclosure is not limited to the above embodiment, and various modifications are possible within the scope of the present disclosure. For example, in the above embodiment, a monochrome printer has been described as an example of the image forming apparatus 1, but the present disclosure is applicable also to tandem-type and rotary-type color printers. Further, the present disclosure is applicable also to image forming apparatuses such as copiers, facsimile machines, and multifunction peripherals having functions of these apparatuses. However, the photosensitive drum 31 and the development portion 33 that employs a nonmagnetic one-component development method need to be provided. Further, in the above-described embodiment, a description has been given of a configuration where a nonmagnetic toner is contained inside the development housing 330 of the development portion 3, but instead, separate from the development housing 330, there may be provided a toner container or a toner cartridge that contains a nonmagnetic toner.

Further, the photosensitive drum 31 in the above-described embodiment uses a cylindrical raw tube as a support body, but a support body having another shape may be used instead. For example, the support body may be plate-shaped or endless-belt shaped. Further, the photosensitive drum 31 in the above-described embodiment uses an organic (OPC) photosensitive layer as the photosensitive layer, but an amorphous silicon photosensitive layer may be used instead. Further, the photosensitive drum 31 may also include a charge injection blocking layer that blocks injection of charge from the support body.

The present disclosure is usable in image forming apparatuses that include a development device employing a nonmagnetic one-component development method where a direct-current voltage is used as the development voltage. By using the present disclosure, it is possible to provide an image forming apparatus where the development voltage can be set such that image density unevenness can be reduced in solid images and half images in various environments.

What is claimed is:

1. An image forming apparatus, comprising:

an image carrier having a photoconductive layer on a surface thereof;

a charging device that charges the surface of the image carrier to a predetermined surface potential;

an exposure device that exposes the surface of the image carrier having been charged by the charging device, forming an electrostatic latent image by attenuating the charge;

a development device that includes a development container storing a nonmagnetic one-component developer composed only of a toner, a developer carrier that is pressed against the image carrier with a predetermined pressing force and on which a toner layer is formed by carrying the toner on an outer circumferential surface thereof, and a regulation blade that contacts the outer circumferential surface of the developer carrier to regulate a layer thickness of the toner layer formed on the outer circumferential surface of the developer carrier, and that supplies the toner to the image carrier on which the electrostatic latent image has been formed; and a development voltage power supply that applies, to the developer carrier, a development voltage that is a direct-current voltage, wherein the image forming apparatus alternately forms white regions and exposed regions at a predetermined pitch repeatedly on the surface of the image carrier to form a solid image with an area ratio lower than 100%, and where V0 represents a white-region potential of the image carrier, VL represents an exposed-region potential of the image carrier, Vt represents a toner-layer potential, and Vd represents the development voltage, expression (1) below is fulfilled:

$$Vd \leq 0.5*(V0-VL)+VL-Vt. \quad (1)$$

2. The image forming apparatus according to claim 1, wherein the development carrier has a resistance that is 8.0 log Ω or higher, a toner supply member is provided that supplies the development carrier with the toner, and the development voltage power supply is capable of applying, to the toner supply member, a supply voltage that is different from the development voltage, and where Vs represents a supply assist voltage that is part of the supply voltage that contributes to supplying the toner to the image carrier, expression (2) below is fulfilled:

$$Vd \leq 0.5*(V0-VL)+VL-Vt-Vs. \quad (2)$$

3. The image forming apparatus according to claim 1, wherein an amount of toner conveyed by the development carrier is 5 to 10 $g/m^2$, and $Vd-VL \leq 100$ is fulfilled.

4. The image forming apparatus according to claim 1, wherein the solid image is formed with an area ratio of 40% to 80%.

5. The image forming apparatus according to claim 1, wherein the solid image is formed by using a line screen or a dot screen.

* * * * *